United States Patent [19]

Espelage et al.

[11] Patent Number: 4,763,059
[45] Date of Patent: Aug. 9, 1988

[54] METHOD AND APPARATUS FOR INDUCTION MOTOR DRIVE

[75] Inventors: Paul M. Espelage, Salem; James M. Nowak, Roanoke, both of Va.

[73] Assignee: General Electric Company, Salem, Va.

[21] Appl. No.: 65,529

[22] Filed: Jun. 23, 1987

[51] Int. Cl.$^4$ .............................................. H02P 5/34
[52] U.S. Cl. ....................................... 318/811; 363/39; 363/41; 363/42
[58] Field of Search ............... 318/800, 801, 809, 811, 318/721, 723; 363/39, 40, 41, 42, 96

[56] References Cited

U.S. PATENT DOCUMENTS

| | | | |
|---|---|---|---|
| 3,739,253 | 6/1973 | Humphrey et al. | 363/42 |
| 4,099,109 | 7/1978 | Abbondanti | 363/42 |
| 4,290,001 | 9/1981 | Espelage et al. | 318/811 |
| 4,562,396 | 12/1985 | Espelage et al. | 318/809 |
| 4,581,693 | 4/1986 | Ueda et al. | 363/42 |

OTHER PUBLICATIONS

"Selected Harmonic Reduction in Static D-C-A-C Inverters" by F. G. Turnbull, IEEE Transactions Paper 63–1011, 1963 (5 pages).
H. Patel Doctoral Dissertation—University of Missouri, 1977 (218 pages and index).
"Generalized Technigues of Harmonic Elimination and Voltage Control in Thyristor Inverters" Parts I & II, Patel et al., Citation Unknown, Prior to 1985.
"Evaluation of Techniques for Reducing Shaft Cogging in Current Fed AC Drives" by J. Zubek—1978 Ind. Appl. Soc. Annual Meeting Conf. Record—pp. 517-524.

Primary Examiner—William M. Shoop, Jr.
Assistant Examiner—Brian Young
Attorney, Agent, or Firm—Arnold E. Renner

[57] ABSTRACT

An induction motor drive including a current source inverter system having controlled turn on and turn off semiconductors in a load side inverter selectively places notches in the waveshape of the current supplied to the parallel combination of the motor and a capacitor bank for the minimization of harmonics.

13 Claims, 10 Drawing Sheets

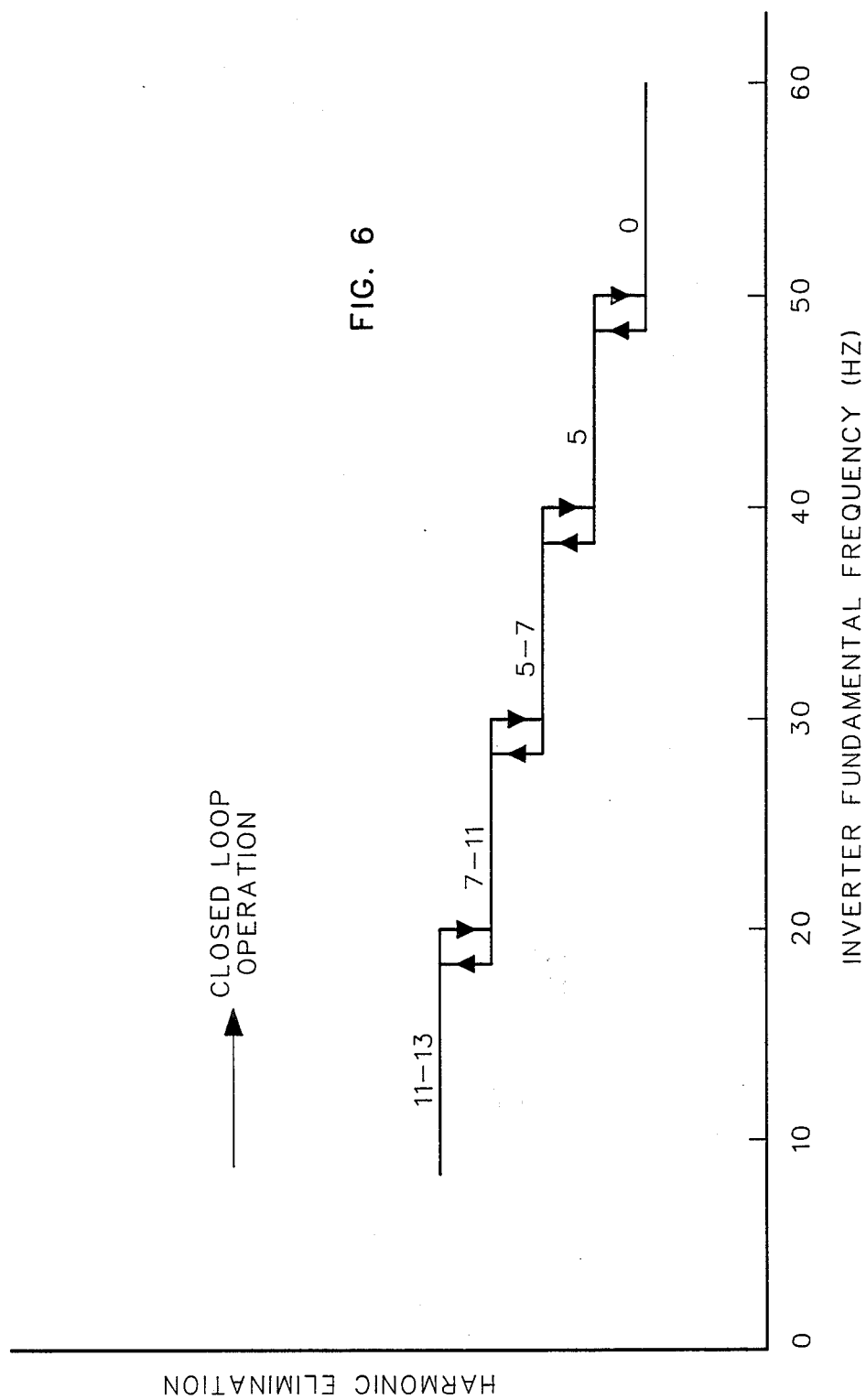

METHOD AND APPARATUS FOR INDUCTION MOTOR DRIVE

REFERENCED MATERIAL

Reference is made to a microfiche appendix which sets forth computer program listings applicable to the present invention and description. Included is one microfiche including 56 frames sheets of computer listings (including title pages).

BACKGROUND OF THE INVENTION

The present invention relates generally to alternating current motor drives and, more particularly, to a variable speed induction motor drive of the type including semiconductor devices capable of being turned on and turned off in response to control signals.

There are a number of instances where it is desired to have a variable speed motor drive using an alternating current induction motor. A number of inverter drives for providing this function are known and it is also known that the standard, so called, square wave output of such inverter drives tends to provide harmonics of the fundamental square wave frequency to the induction motor. These harmonics can cause the motor to overheat and/or to develop torque pulsations in its mechanical output. This is particularly true in the retrofit market where it is often desired to provide an inverter drive having variable speed capabilities to an existing or fixed speed motor installation without requiring motor derating as a result of the inverter output waveshape. It is known in such drives to place a large load filter capacitor at the output of the inverter (the motor input) in order that the input current and voltage to the motor is a sine wave. However, the 120 degree rectangular current waveshape produced by such inverter drives normally produces harmonics of "n" times the fundamental frequency wherein "n" is an odd number, not a multiple of the number of phases. The electrical reasonance of the load filter capacitor with the motor leakage inductance can be excited by different fundamental frequency harmonics over the motor speed range. Continuous operation of the drive at speeds where that reasonance is being excited can cause torque harmonics which make motor performance unacceptable or potentially damaging to the load on the motor.

A number of techniques have been employed to eliminate selected harmonics in voltage source inverters. See, for example, that described by Turnbull in 1963 IEEE transactions, paper 63–1011, entitled "Selected Harmonic Reduction in Static AC/DC Inverters". Hasmuth Patel generalized this approach in his doctoral dissertation at the University of Missouri in 1971. Several Japanese authors have discussed the pulse width modulation of inverter drives for current source inverters to improve current waveshape and some also include a load capacitor of a relatively small magnitude on the inverter output, primarily for the purpose of high frequency filtering. These drives have not, however, utilized a large load capacitor as a primary means of improving the motor current waveshape and maximizing the power factor of the drive. Neither have these references employed the selective providing of notches within the fundamental waveshape to control the harmonics applied to the capacitor/motor combination as a function of the fundamental frequency and the size of the electrical components.

SUMMARY OF THE INVENTION

It is, therefore, an object of the present invention to provide an improved induction motor drive.

It is another object to provide an improved method and apparatus for the operation of an induction motor over a range of speeds.

It is a still further object to provide a scheme for the reduction of harmonic effects in a variable speed alternating current induction motor drive.

It is an additional object to minimize the harmonic effects associated with variable speed operations of an induction motor by varying the current waveshape, by notching, as a function of the fundamental frequency of that waveshape.

The foregoing and other objects are achieved, in accordance with the present invention, by providing an alternating current motor drive including a polyphase induction motor which has corresponding phase windings and a determinable inductance. A capacitor bank, including a plurality of capacitors, is connected across the motor phase windings. The motor windings and the capacitors collectively define a circuit having a defined electrical resonance. A current source inverter circuit supplies an electrical output current at controllable frequencies to the motor and capacitor combination. The inverter is controlled in a variable frequency mode such that the desired fundamental frequency can be determined and, in response to an indication of that fundamental frequency, the current waveshape (square wave) is modified by the selective introduction of notches. The notches vary in number and duration in accordance with a predetermined relationship as a function of the fundamental frequency.

BRIEF DESCRIPTION OF THE DRAWING

While the present invention is defined in particularity in the claims annexed to and forming a part of this specification, a better understanding of this invention can be had by reference to the following specification taken in conjunction with the accompanying drawings in which:

FIG. 6 illustrates a typical relationship between the fundamental inverter output frequency and the harmonics desired to be eliminated in an inverter output current;

DETAILED DESCRIPTION

Figure 1A:
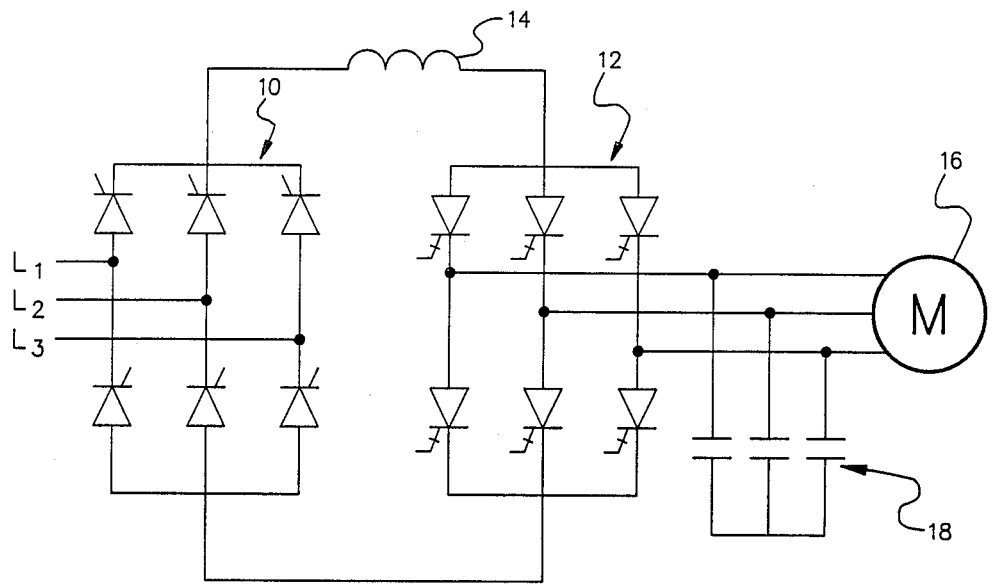
FIGS. 1a and 1b are schematic diagrams illustrating typical induction motor drive power circuits to which the present invention is applicable.

Referencing first FIG. 1a, shown is a basic power circuit of an induction motor drive within which the present invention can find utility. A source side converter 10, comprised as is well known in the art of a six legged controlled semiconductor (thyristor) bridge (for a three phase embodiment), is connected to a source of alternating current (AC) power designated $L_1$, $L_2$ and $L_3$. By controlling the time (phase angle) at which the various thyristors of the bridge 10 are rendered conductive, the voltage and the current supplied to the load may be varied. A load side converter 12 also has six legs. In this case, however, the controlled semiconductors are illustrated as the type which exhibits both turn-on and turn-off capabilities in response to control signals. Preferably, these semiconductors are of the class referred to as a Gate Turnoff Thyristor (GTO). (It will be apparent as this description precedes that other devices such as power transistors which have the capability of being turned on and turned off also may be used. The GTO thyristor, however, is becoming increasingly popular and in this description that phraseology will be used for the sake of brevity.) A large inductor 14 is placed in a direct current (DC) link between the two power converters 10 and 12 such that the overall system becomes one what is commonly called a current source converter. In FIG. 1a, the junction points of the respective leg pairs of the load side inverter 12 are connected to a polyphase alternating current induction motor 16. A capacitor bank 18 is connectd in parallel with the phase windings of the motor. As will be further discussed, these capacitors are rather large and in the preferred embodiment of the present invention provide, essentially, only waveshaping; i.e., converting the basically square wave fundamental frequency output of the source load side converter 12 into a sine wave current for application to a motor. When GTOs are used, they may be symmetrical or asymmetrical. A symmetrical GTO has voltage blocking capability in both directions. An asymmetrical GTO has voltage blocking capabilties in the forward direction only. If an asymmetrical GTO is used in a current source inverter, a diode is placed in series with the asymmetrical GTO to provide the reverse blocking capability. In addition, a diode is placed inverse parallel across the asymmetrical GTO to guarantee it gets no reverse voltage. Regardless of the semiconductor devices used, appropriate snubbing circuits which have not been shown, will be included as known in the art.

Figure 1B:
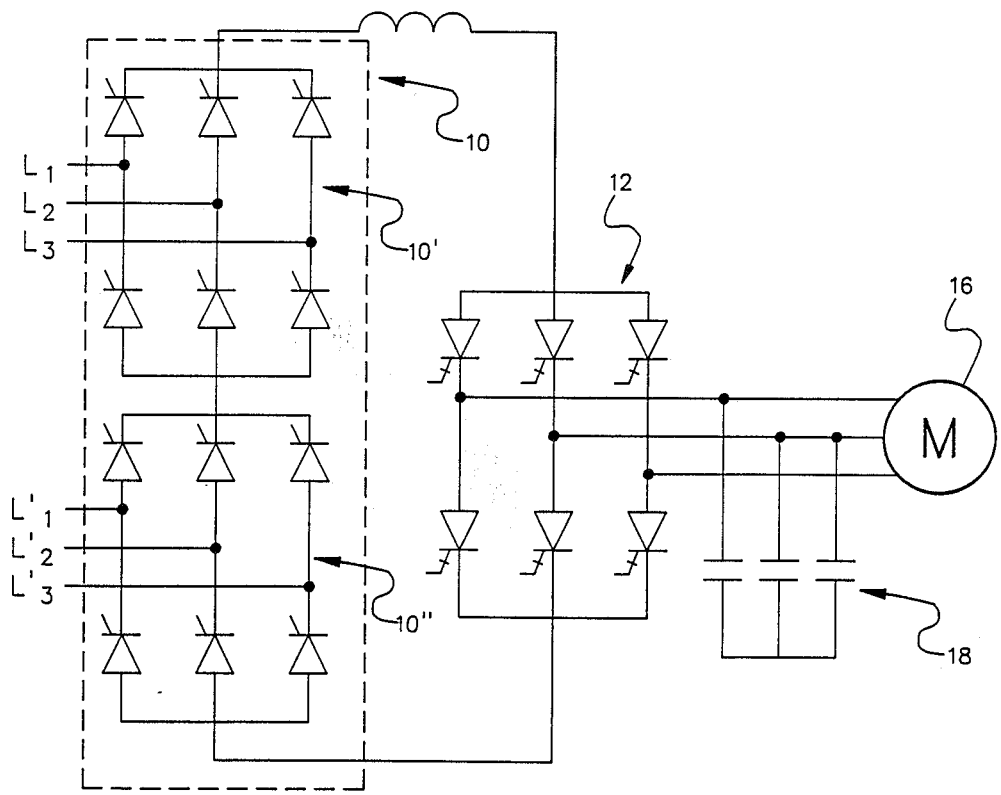

FIG. 1b is very similar to FIG. 1a with the exception being that the source side inverter 10 is here comprised of two series connected bridges 10' and 10" both of which are connected to AC sources 30 electrical degrees displaced. This depiction is included for purposes of illustration to demonstrate that multiple connections of the source converters, such as that illustrated, may be made to reduce the current harmonics in the source supply.

Figure 2:
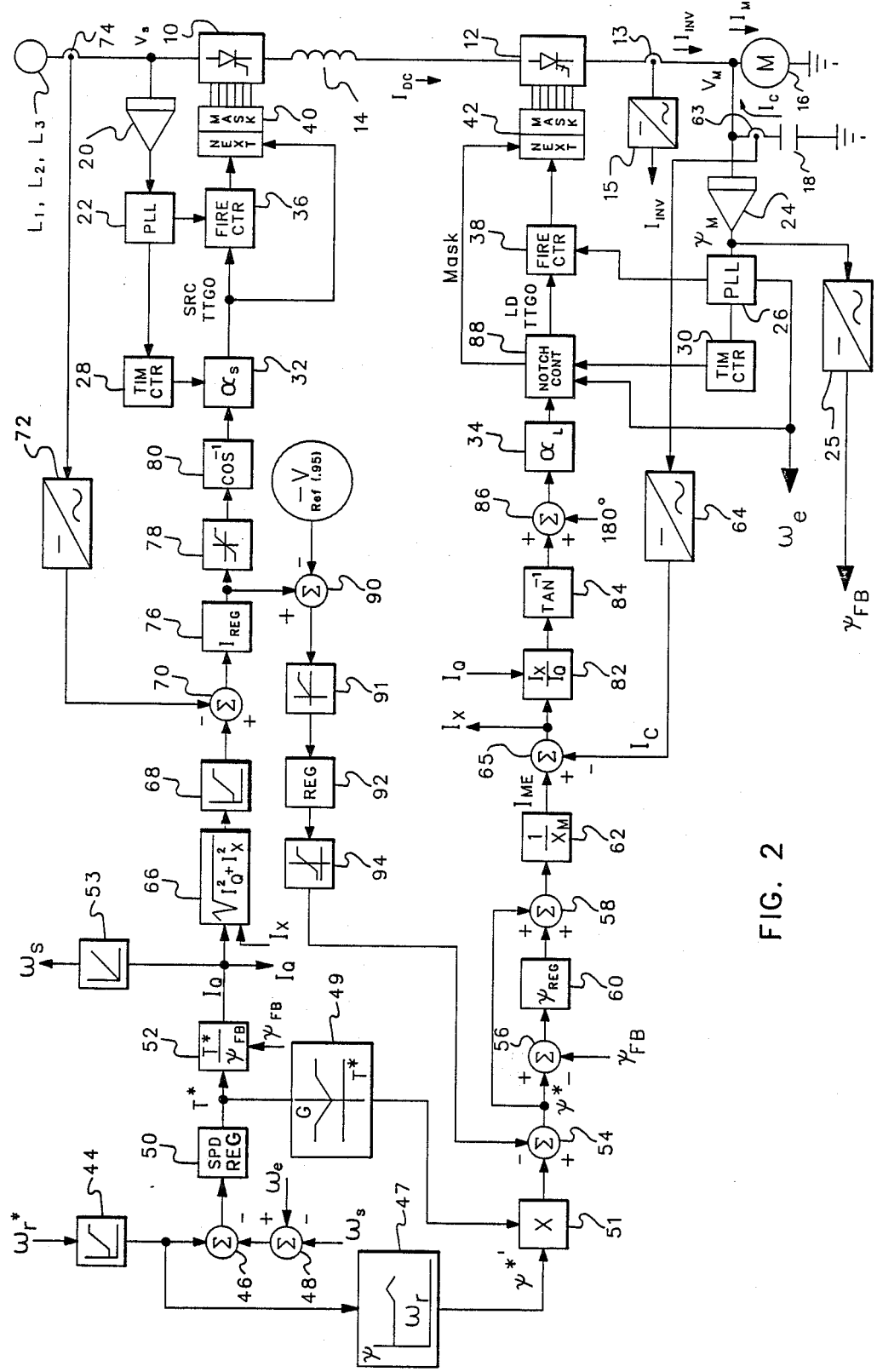
FIG. 2 is a block diagram illustrating the apparatus and method of the present invention in analog form.

FIG. 2 is a high level one line schematic diagram illustrating an analog implementation of the system of the present invention. Building from the depictions of FIGS. 1a and 1b, a source side AC to DC converter 10 is connected to a source of polyphase (three phase) power $L_1$, $L_2$ and $L_3$. The output of the converter 10 is connected by DC link circuit including inductor 14 to the load side converter or inverter 12 which, in accordance with the previous discussion, is preferably a GTO three phase inverter. The output of that inverter is supplied to the parallel connected combination a motor 16 and a capacitor bank 18. By suitable means such as a current transformer 13, the output of which is applied to a suitable rectifier circuit 15, there is provided a DC signal ($I_{INV}$) representing the inverter output current. The inverter current combined with the current from the capacitor bank 18 ($I_C$) constitutes the motor current $I_M$. As will be more fully explained, the output of the inverter 12 is a variable frequency AC current which selectively contains notches to reduce harmonics within the motor/capacitor circuit.

The three phase source voltage ($V_S$) is integrated in an integrator 20 the output of which forms an input to a phase lock loop 22. In a similar manner, the motor voltage $V_M$ is furnished to a suitable integrator 24 the output of which is applied to a second phase lock loop 26. The outputs of the phase lock loops 22 and 26 are furnished, respectively, to source side and load side timing counters 28 and 30 to maintain those timing counters in synchronism with the corresponding source and motor voltages. The timing counters keep track of the angular time within the fundamental frequency periods and in the present embodiment are designed to provide an angular time of 0.352° of the 360° fundamental frequency period. Phase lock loop 26 also provides a signal $\omega_e$ representative of the extant motor frequency. Motor speed is then derived from $\omega_e - \omega_s$ where $\omega_s$ is the approximated motor slip frequency. (For a better explanation of one possible implementation of the phase lock loop, reference is made to U.S. Pat. No. 4,449,087, "Flux Feedback Firing Control for a Load Commutated Inverter" by Lippitt et al., which patent is assigned to the assignee of the present invention.)

At the source side of the system, a load firing angle command ($\alpha_S$) is derived from block 32. In this block, a command (representative of electrical degrees) from a $\text{Cos}^{-1}$ block 80 is compared with the actual time in degrees read from the timing counter 28 and the angular difference is delivered to a source fire counter 36 as a time to go (TTGO) signal. Counter 36 is decremented by the 0.352° clock from the phase lock loop 22. When the counter 36 is decremented to zero, the next pair of source thyristors of the inverter 10 to be fired is shifted into the mask latch 40. In a similar manner, a load firing angle command ($\alpha_L$) from block 34 is provided to a notch control 88 (to be later described). Control 88 receives timing pulses from timing counter 30 and provides an output, signal (TTGO) to the fire control 38. Control 38 also receives an input from the phase lock loop 26 and is decremented and acts in the same manner as described above. The output fire control 38 is provided to the next mask circuit 42 associated with the load side inverter 12.

The two commands $\omega_s$ and $\omega_L$ are generated substantially as follows. A speed command signal $\omega_r^*$, which may be derived from any suitable source such as a manual input or the input from an automated system, is supplied to function block 44 which puts acceleration and deceleration and minimum and maximum speed limits on a speed set point which is supplied to a summing junction 46. Junction 46 also receives an input from a summing junction 48 which receives as its two inputs the $\omega_e$ signal, representing the extant motor frequency, and a signal $\omega_s$ which is the calculated value of an approximation of the slip frequency. The output of the summing junction 46 is a speed error signal which is supplied to a speed regulator 50, a proportional plus integral regulator. That is, regulator has a transfer function $$K \frac{1 + ST}{S},$$

wherein S is the Laplace operator. The output of speed regulator 50 is a torque command signal T* representing the torque necessary to correct the speed error.

The torque command signal T* is furnished to a divider 52 the other input of which is a signal representing the motor flux ($\psi_{FB}$). The $\psi_{FB}$ signal is the output of a rectifier circuit 25, held to a minimum so that it cannot go to zero even at very low speed, which receives at its input the output of the integrator 24. The result of the division in block 52 (T*/$\psi_{FB}$) is a signal designated $I_Q$ which is the commanded value of the torque producing component of the DC link current ($I_{DC}$) from converter 10. The signal $I_Q$ is supplied to a simple gain circuit 53 the output of which is the $\omega_s$ signal.

A flux command signal $\psi^*$ is developed at the output of a summation junction 54 which has two inputs. Ignoring the cross tie (negative) input for the moment, the remaining input to summing junction 54 is from a multiplier 51. Multiplier 51 has two inputs, one of which is a function of the speed set point and another which is a function of the T* signal. In this regard, the output of block 44 is applied to a transfer function block 47 which provides an initial flux set point signal $\psi^{*'}$ output as a function of the signal applied thereto. The other input to multiplier 51 is out of function block 49 which is an absolute value circuit having predetermined maximum and minimum outputs and adjusts the flux set point as a function of commanded motor torque. The output of summing junction 54 ($\psi^*$) is applied in a positive sense to a second summing junction 56 the other input of which is the $\psi_{FB}$ signal applied in a negative sense. The $\psi^*$ signal out of junction 54 also forms one input, in a positive sense to a summing junction 58 which receives its other positive input from a flux regulator circuit 60, a proportional plus integral regulator. The output of junction 58 is thus a function of commanded and actual values of motor flux.

The output of summing junction 58 is applied to a scaling circuit 62 where it is scaled by a factor of $1/X_M$, wherein $X_M$ is the value of the magnetizing impedance of the motor 16. For any given motor, this will be a fixed value known from the motor parameters. The output of the circuit 62 is a signal $I_{ME}$ representing the required motor exciting current. Since the motor is already being excited by the capacitor current $I_C$, that value is subtracted from the $I_{ME}$ value in summing junction 65 such that the output of summing junction 65 is a signal $I_X$ representing the component of the motor exciting motor current the converter 12 must apply to the motor. The $I_C$ signal is derived in any suitable manner such as by use of a current transformer 63 and a rectifier circuit 64. The $I_C$ value can also be derived by calculation using various known system parameters such as motor speed or frequency of applied current, motor flux and value (C) of the capacitors. That is, it can be shown that the value of $I_C$ is, essentially: $I_C = \omega_e^2 \cdot \psi \cdot C$. It may be advantageous to use this method in certain instances; e.g., in a digital implementation.

The $I_Q$ and $I_X$ current signals collectively form the basis of providing the angle command signals out of blocks 32 and 34. In the control of the source side converter 10, the $I_Q$ and $I_X$ signals are applied to function block 66 wherein the square root of the sum of the squares is taken. The output of block 66 is applied to a minimum/maximum clamp circuit 68. The output of circuit 68 is a current setpoint which serves as one input to a summing junction 70. The other input to junction 70, applied in the opposite sense, is from a rectifier circuit 72 which receives its input from source side current transformers 74. The output of the rectifier 72 is a signal representing the actual value of the input current to the source converter 10 and, as such, is proportional to the DC link current $I_{DC}$. The output of summing junction 70 representing the error between the actual and the commanded DC link current is supplied to a proportional plus integral regulator 76, the output of which is a signal proportional to the commanded DC link voltage. This latter signal is supplied to a minimum/maximum clamp circuit 78 the output of which is supplied to a $\cos^{-1}$ lookup table 80 such as is well known in the art. The output of function 80 forms the input to the angle command signal block 32 earlier described.

In the lower branch which controls the inverter 12, the $I_X$ signal is divided by the $I_Q$ signal in block 82 and the output of that block is supplied to a $\tan^{-1}$ function, block 84. The output of that block 84 is an angle delta ($\delta$) which is described in FIG. 3. This angle delta is converted to a converter firing signal in summing junction 86 by having added thereto a signal representative of 180 electrical degrees. The output of summing junction 86 is applied to the $\alpha_L$ angle command signal 34 earlier described.

A notch control circuit 88, which serves to control the notching of the present system takes the firing angle information ($\alpha_L$) along with timing information from the timing counter 30 to determine what the next firing mask will be and when to fire. In a basic 120° square wave, there will be no notching. However, based upon the description to follow, notches may be selectively employed to provide the notching function for harmonic minimization as earlier discussed.

Based upon the inverter frequency ($\omega_e$) information from the phase lock loop 26, notch control block 88 will decide what harmonics, if any, need to be eliminated. A table lookup is used by the notching control to obtain the number of notches and their widths. This information is used to supplement the firing information for the 120° square wave. The firing information (fire mask and times to go) for the notched 120° square wave are loaded into the fire counter 38 and the next mask latch 42. A more complete description of the notching function will follow.

Figure 3:
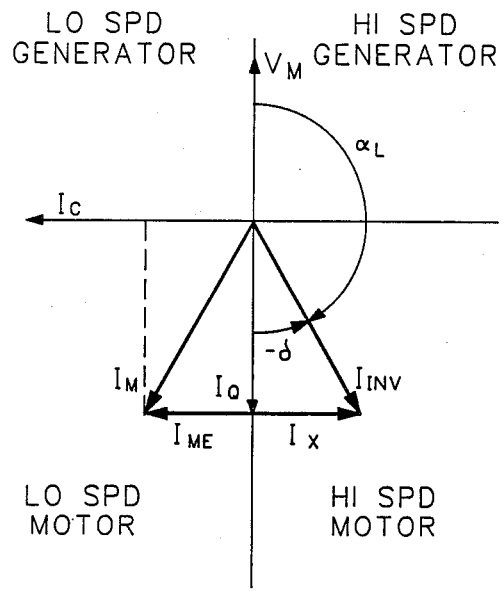
FIG. 3 is a vector diagram useful in understanding the system of the present invention.

FIG. 3 represents the $\delta$ angle signal earlier discussed. This angle is that which exists between the inverter current $I_{INV}$ and the $I_Q$ signal, the torque producing component of the motor current. In all other respects the depiction of FIG. 3 appears to be self explanatory.

The remaining depiction in FIG. 2 relates to the cross tie feature earlier mentioned. If, for some reason, the main AC power supply ($L_1$, $L_2$, and $L_3$) exhibits a voltage reduction, the motor voltage reflected to the DC link may exceed the ability of the source converter 10 to match the reflected DC voltage. Were this the case, the DC link current could extinguish causing the current regulator for the DC link current to lose control and essentially drive the system into an unstable limit cycle. In order to prevent this, a crosstie regulator is incorporated. The DC link voltage current command from the regulator 76 is sensed and when this signal gets to a value greater than some fixed percentage (for example, 95 percent) of the clamp value established by limiter 78 an appropriate single is generated. Referencing FIG. 2, this is accomplished by furnishing the output of the current regulator 76 to summing junction 90 as a positive signal. The second input to junction 90 is a fixed value reference shown to be at approximately 95 percent of the maximum or clamped value out of block 78. This reference is indicated as voltage $-V$. The output of junction 90, the difference between the two input signals, is provided to a positive only clamp circuit 91 the output of which is furnished to a proportional plus integral regulator 92. The output of that regulator is in turn limited by limiter 94. As depicted, the output of the limiter 94 cannot go negative and cannot exceed a predetermined positive value. In accordance with the previous description, the output of 94 is provided to the summing junction 54 in a negative sense to decrease the flux command signal from that junction by the amount of the signal from limiter 94.

If it is assumed that the drive is in the motoring condition, the loss of control situation can occur only when the motor is operating at high speed, the load capacitor is over excited and the motor and inverter are being called upon to absorb capacitor reactive volt amperes (VARS). This range of operation will call for an firing angle ($\alpha_L$) of between 90 and 180 electrical degrees. Calling for a decrease of motor flux would call for the inverter to absorb more capacitor VARS which would raise the $I_X$ signal out of summing injunction 65. This, in turn, would drive the inverter firing angle $\alpha_L$ more towards a value of 90°. Since the motor voltage reflected to the DC link is proportional to the product of value of motor voltage and the cosine of $\alpha$, as the load angle approaches a value of 90° the reflected motor voltage to the DC link decreases keeping the current regulator out of its advanced limit and thus able to continue regulating current. An additional factor complicating the situation is that as the motor flux decreases, in order to maintain torque, the $I_Q$ component increases and this tries to swing the load firing angle toward 180° in opposition to the swing of the load firing angle toward 90° called for by the cross tie regulator. Therefore, there has to be a sufficient gain in the regulator 92 for the flux path to prevail. Thus, the cross tie regulator described depends upon decreasing the flux command while the regulator still has some room to be functional and thus the overall system is stabilized.

Figure 4:
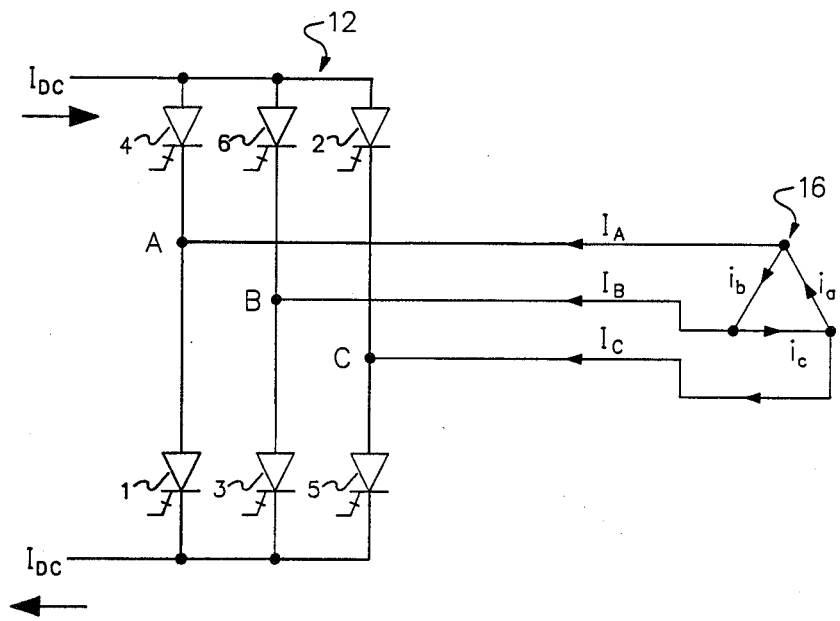
FIG. 4 is a schematic diagram defining certain voltage and current relationships of an inverter.

FIG. 4 illustrates, in schematic form, the basic inverter 12 connected to a three phase induction motor 16. The motor 16 has three windings connected in a delta configuration as illustrated. FIG. 4 further illustrates various currents and voltages which will be used in the following discussion.

It will be remembered from the previous discussion that the basic control commands a desired DC link current via the current regulator 76 (FIG. 2) which operates at a very rapid rate. (For example 250 radians per second.) Inverter 12 is operable to provide a fundamental frequency and phase relationship between the motor voltage and the inverter output current which is regulated at six times the inverter fundamental frequency.

Figure 5:
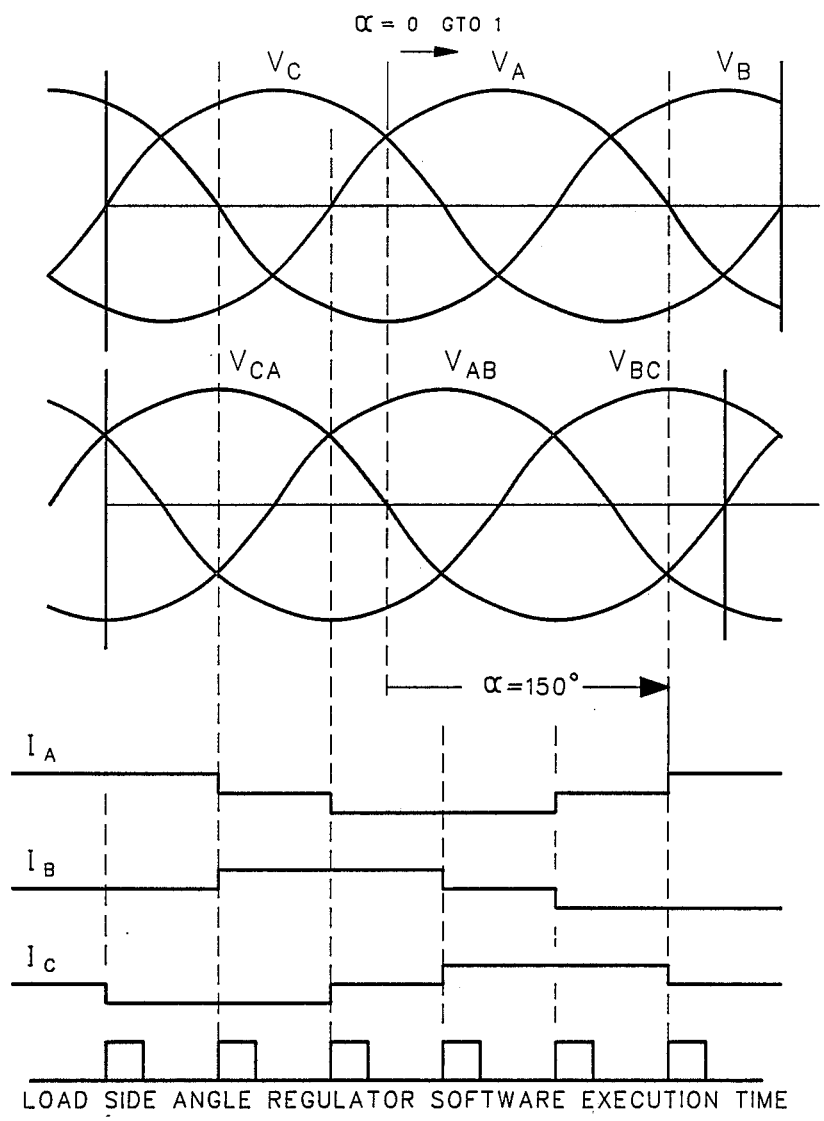
FIG. 5 illustrates the relationship between motor voltage, motor current and load angle regulator software execution time at high speed (high frequency) operation where the fundamental frequency inverter output is not modified by the introduction of notches.

FIG. 5 illustrates several fundamental relationships with respect to the motor voltage, inverter current and load angle regulator software execution time at high speed operation (e.g., greater than eighty percent of rated speed) where no inverter notching is normally employed. Referencing FIG. 5, the upper trace shows the several "line-to-neutral" voltage waveshapes with respect to the illustration of FIG. 4. The second trace shows the phase-to-phase voltages in that figure while the next three traces illustrate the currents $I_A$, $I_B$ and $I_C$. Also illustrated in FIG. 5 is the load angle firing relationship. In the upper trace the $\alpha$ equals zero angle for the GTO device number 1 is indicated while below the second trace there is shown an $\alpha$ angle of 150 electrical degrees.

Figure 8:
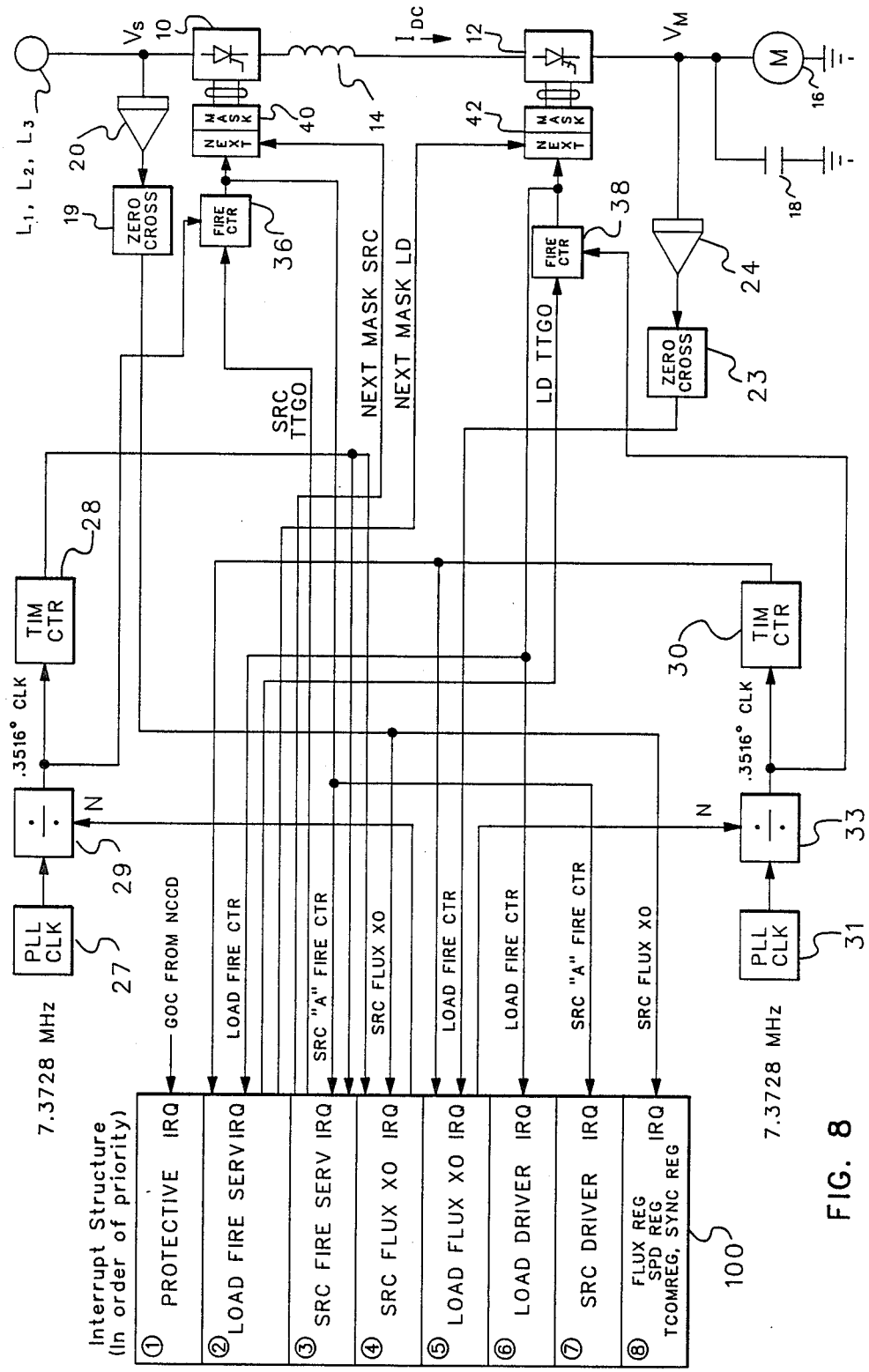
FIG. 8 is a high level block diagram showing a digital (computer) implementation of the system of the present invention; and, FIGS. 9a, 9b and 9c are graphical representations illustrating three phase inverter currents determined for eliminating, respectively, one, two and three harmonics of the fundamental inverter frequency as achieved in the digital embodiment of the system of the present invention.

The last trace shown in FIG. 5, which will be more meaningful with respect to the digital implementation to be described with respect to FIG. 8, illustrates the load side angle regulator software execution time and its relationship to the phase voltages and currents. These blocks indicate the execution time for the software load angle regulator.

References have been made to a notching function which is achieved by the system being described to eliminate or minimize certain inverter current harmonics. (Although this description often speaks of eliminating the harmonics, it is to be understood that "elimination" is usually impractical and that what is generally intended to be achieved is the minimization of the harmonics to the largest practical extent). This notching function normally takes place at speeds below some set value, for example 80 percent of rated speed. The number of notches and the width of those notches is, in accordance with the present embodiment, predetermined as a function of the motor speed (i.e., frequency) and in accordance with the known values of the motor leakage impedance and the value of the capacitors of bank 18. From these latter two values, the resulting resonant frequency can be calculated and related to various harmonics of the fundamental frequency as applied to the motor 16 from inverter 12 as that frequency is varied through the motor speed range.

FIG. 6 is a graphical representation of a typical relationship of harmonics desired to be eliminated in a system. As a representative example, the motor and capacitor circuit may have a resonance in the frequency range from approximately 185 to 210 hertz (Hz) when the per unit impedance of the load capacitor, with respect to the motor, is about 1.5 to 2.0. FIG. 6 is scaled for a 60 Hz system and it is seen that in the approximate range of 49 to 60 Hz, no harmonics need be eliminated and hence no notching is to be performed. In the range of approximately 39 to 49 cycles the fifth harmonic is a problem and thus notching will be effective to eliminate that harmonic. Similarly, the fifth and seventh harmonics in the 29 to 39 Hz range are harmful while seventh and eleventh harmonics are to be eliminated in the 19 to 29 Hz range. From about 9 to 19 Hz the 11th and 13th harmonics are the primary ones which are harmful. The minimum required motor speed is typically 10–15% or 6–9 hz. On starting up the motor from rest, the inverter is run in an open loop frequency mode rather than a closed load angle mode. Notching of the inverter current is not normally, but could be, used in the open loop mode. It is further shown in FIG. 6 that it is advisable to add hysteresis to the notching mode switchover frequencies depending upon whether the system is going up or down in frequency. That is, as an example, the shift point might be at 48 Hz when the system is going down in frequency and 50 Hz when going up.

Figure 7A:
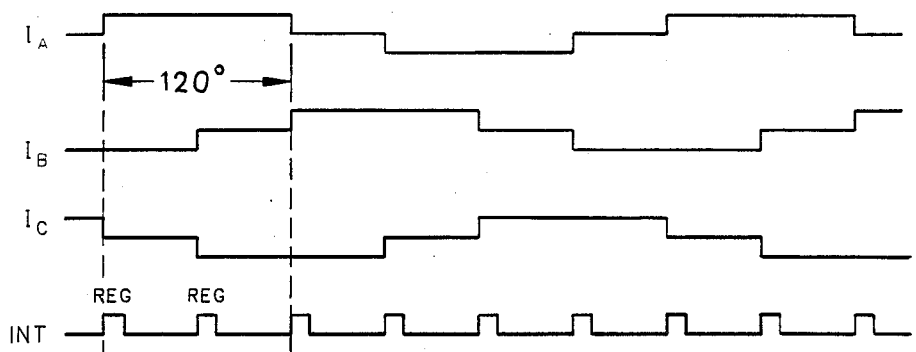
FIGS. 7a, 7b and 7c are graphical representations comparing inverter current wave forms when, respectively, zero, one and two harmonics of the fundamental inverter output frequency are being eliminated from the inverter current wave form in accordance with the present invention.
Figure 7B:
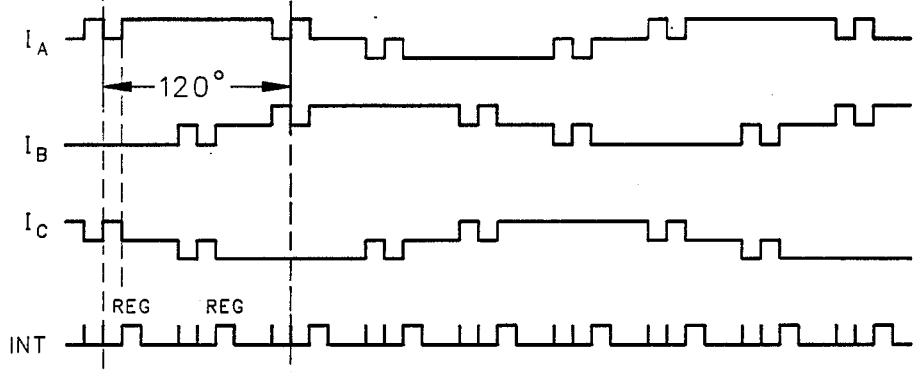
Figure 7C:
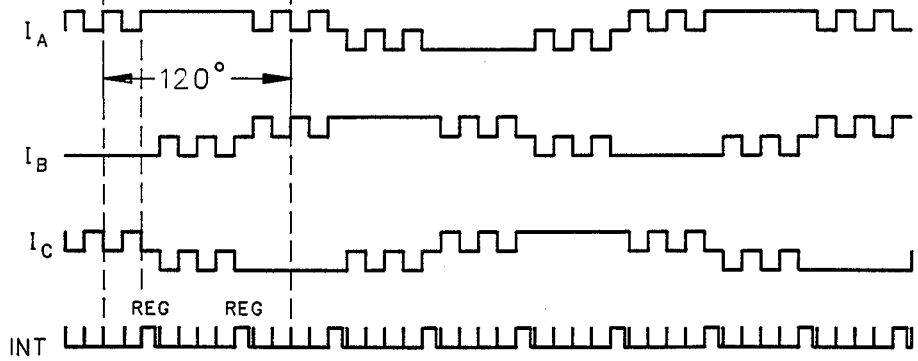

FIGS. 7a, 7b and 7c, respectively, compare inverter current waveforms when zero, one and two harmonics of the fundamental frequency are to be eliminated in the inverter output current. As illustrated, when no harmonics are to be eliminated, there are no notches in a 120° portion of the cycle. One additional notch is formed in each one-fourth cycle in the inverter current wave form for each harmonic to be eliminated. That is, if one harmonic is to be eliminated one notch per one-fourth cycle is effected. If two harmonics are to be eliminated, then two notches per quarter cycle are to be employed.

The position and width of the notch depends upon the harmonics being eliminated. One method of determining the notch angles to eliminate a particular set of harmonics involves the solution of sets simultaneously non-linear transcendental equations. As such, there is no unique solution for the notches but rather a number of solutions. Preferably, these solutions are achieved by a technique described in forementioned Patel dissertation which is hereby incorporated by reference, whereby the non-linear equations are linearized about an initial estimation of solution angles. An optimization routine is then used to converge to a solution. A number of solutions are obtained and the best solution is picked based upon the percent of the fundamental component to the maximum available fundamental component, the ratio of various remaining harmonic amplitude to fundamental amplitudes and required notch widths with comparison to the minimum notch width practical to implement in a microprocessor control.

Reference is now made to FIG. 8 which illustrates a digital (i.e., computer) implementation of the present system. Again, the source $L_1$, $L_2$, $L_3$ is connected to converter 10 which supplies DC current via link inductor 14 to the inverter 12. The output of inverter 12 is supplied to the combination of motor 16 and capacitor bank 18. The source voltage $V_S$ is integrated by an integrator 20 whose output is supplied, in this illustration, to a zero crossing detector which in the analog implementation was included in the phase lock loop 22. In a similar manner the motor voltage $V_M$ is integrated at 24 and this integrated value is provided to a second zero crossing detector 23 which in the earlier embodiment was included in phase lock loop 26. The outputs of the two zero crossing detectors form inputs to a microprocessor 100 which is illustrated as a plurality of interrupt structures in the order of their priority. Microprocessor 100 might be for example an INTEL 80286 microprocessor which is programmed, insofar as the notching feature of the present invention is concerned, in accordance with the attached Appendix program listings.

Also shown in FIG. 8 are respective fire counters 36 and 38 providing inputs to the next masks units 40 and 42 which, in this case, receive mask inputs from the microprocessor 100. Timing counters 28 and 30 are included. Counter 28 is provided with an input from a divide circuit 29 which receives as one input a suitable clock signal which may be, for example, a 3.3728 megahertz clock 27. This clock signal is divided by an integral N supplied by microprocessor 100 to provide an output clock to the timer counter of, for example, 0.3516 electrical degrees. Similarly, timing counter 30 receives a clock signal which may also be of the same electrical degree magnitude from a divide circuit 33 which receives an input from a phase lock loop clock 31.

Figure 9A:
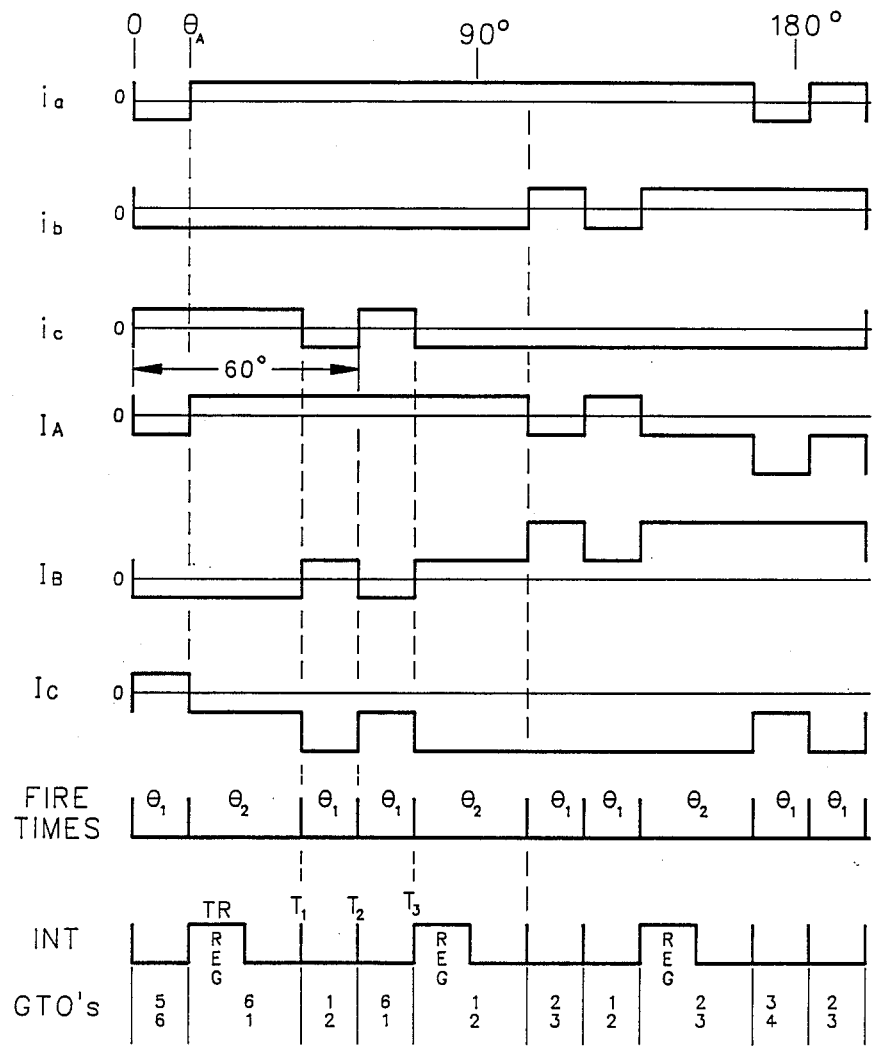
Figure 9B:
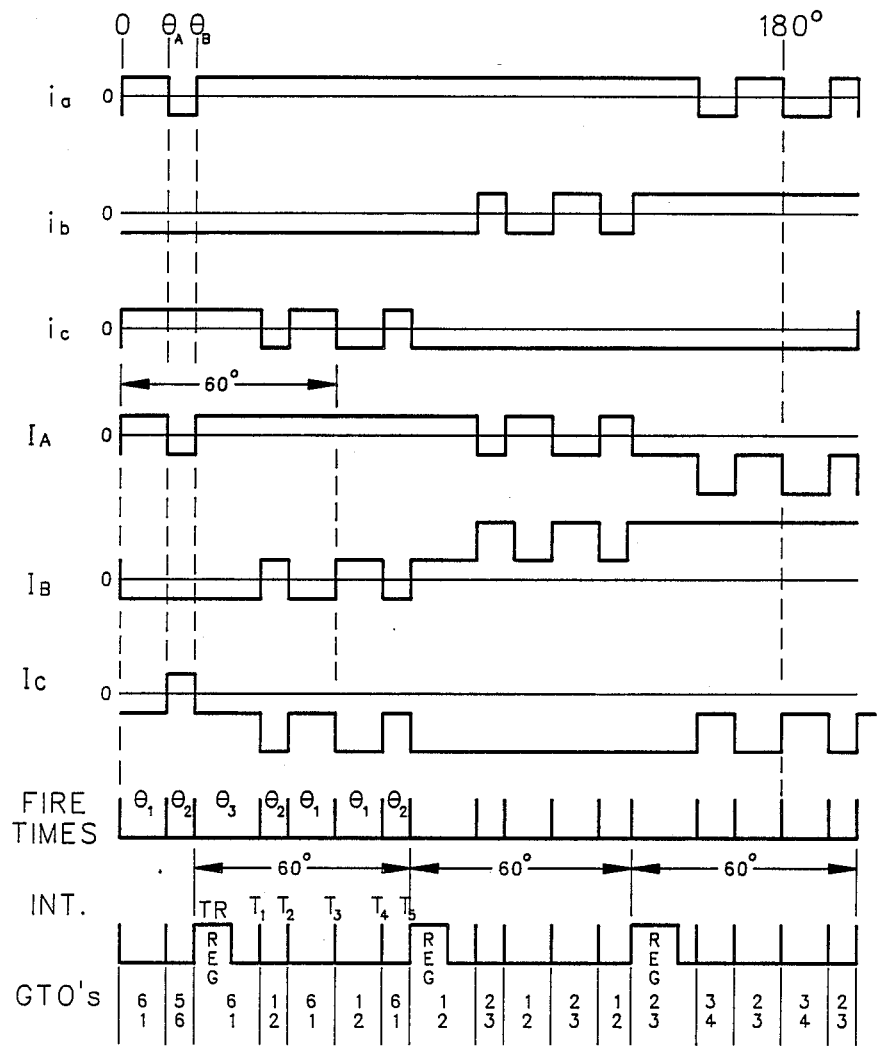
Figure 9C:
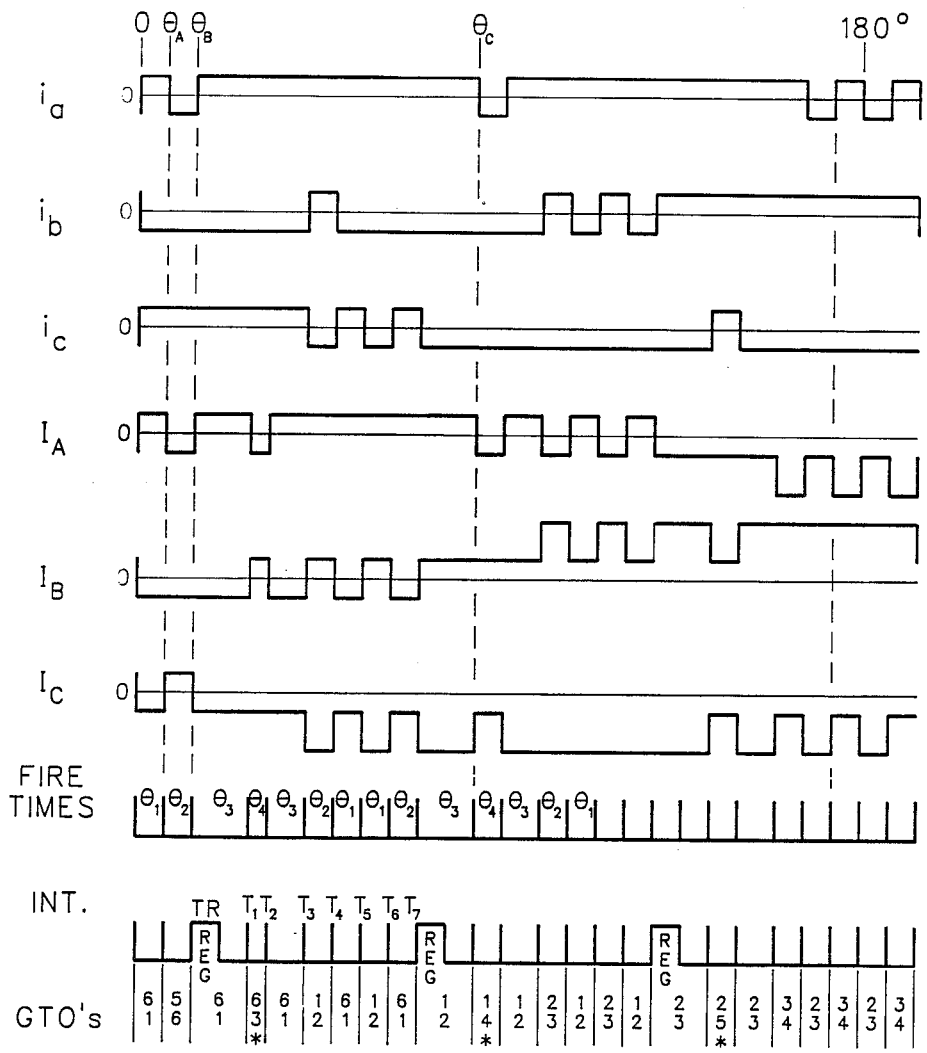

Before discussing the interrupts of the microprocessor, a better understanding of notching feature of the present system may be had by reference to FIGS. 9a, 9b and 9c. These figures are graphical representations illustrating, respectively, elimination of one, two and three harmonics. The designations of these three figures are in accordance with the showing of FIG. 4. In each figure, the upper three traces depict the currents ($i_a$, $i_b$, $i_c$) which are the theoretical inverter phase currents. The middle three traces are the three inverter line currents, respectively, $I_A$, $I_B$ and $I_C$. The seventh trace in each instance is the selected firing times of the several thyristors of the inverter 12 while the penultimate trace is that which illustrates the interrupt execution of the microprocessor with respect to the overall system timing device. The bottom trace in each figure illustrates which of the semiconductor devices within the bridge 12 are on at any particular time within the cycle. A 60° symmetry occurs such that the firing time pattern of the several GTO repeats each 60°. The actual pairs of devices being switched do change with each 60° segment. During a particular 60° segment when eliminating one or two harmonics, the GTOs being fired alternate between the same two GTO pairs, for example, the GTO sequences 1-2, then 2-3, then 1-2, etc. That is, a forward firing followed by a backward firing. For the next 60° segment the GTO firing in sequence is advanced to 2-3, then 3-4, then 2-3, etc. Thus, the DC link current is maintained constant during the notching and switched back and forth through different motor phases.

When eliminating more than two harmonics, however, (see FIG. 9c), to satisfy the solutions to the harmonic elimination equation described earlier, there can be short intervals of zero motor current. This is accommodated by maintaining constant DC link current but routing this current through an inverter diametric path rather than through the motor. This is illustrated in FIG. 9c and shown by those periods of the bottom trace designated with the asterisk.

Typical firing time examples, looking first to FIG. 9a, are that angle $\theta_1$ is equal to $\theta_A$. $\theta_2$ is equal to $60° - 2\theta_A$. Again typically if the fifth harmonic of the fundamental frequency is to be eliminated, $\theta_A$ might be set at approximately 12 electrical degrees, while the elimination of the seventh harmonic would require an $\theta_A$ of approximately 8.5 degrees. In eliminating two harmonics (FIG. 9b) $\theta_1$ is equal to $\theta_A$ while $\theta_2$ is equal to $\theta_B - \theta_A$. $\theta_3$, in FIG. 9b is equal to $60° - 2\theta_B$. In this case, again as an example, if the fifth and seventh harmonics are to be eliminated, $\theta_A$ might be equal to 16.2° and $\theta_B$, 22°. Eliminating the seventh and eleventh harmonics would suggest using a $\theta_A$ equal to 10.6° and $\theta_B$ equal to 14.8°. Elimination of the eleventh and thirteenth harmonics takes respectively $\theta_A$ and $\theta_B$ angles of 8.3° and 11° respectively.

In respect to FIG. 9c, a typical like example will be:
$\theta_1 = \theta_A$
$\theta_2 = \theta_B - \theta_A$
$\theta_3 = \theta_C - \theta_B - 60°$
$\theta_4 = 2(90° - \theta_C)$; and,
to eliminate the 5th, 7th and 11th harmonics
$\theta_A = 9.4°$
$\theta_B = 14.8°$ $\theta_C = 88.8°$ Again, respecting the digital implementation still with referencing to FIGS. 9a through 9c, for practical considerations with regard to software excecution time, it is desirable to execute the load angle regulator software (reference the "INT" trace in each figure) every 60° of the fundamental load inverter frequency between the GTO cell firings in the 60° interval that has the most time available. As best illustrated by FIGS. 9a and 9b this longest time interval occurs prior to the first firing of a new GTO cell pair. The placement of a fundamental frequency load angle regulator within the 60° interval is arbitrary so long as the phase relationship between the motor voltage and the fundamental component of the inverter current is maintained between the no notch mode and the various notching modes. Transitioning between the notching nodes must be made as smoothly as possible with regard to the phase relationship so as to not provide large voltage jumps within the system. The positioning of the load angle regulator is illustrated in FIG. 9a for the elimination of one harmonic and in FIG. 9b for the elimination of two harmonics.

In the penultimate trace of each of these figures, the designation $T_R$ is the software interrupt; that is, it is the extant count in one of the time counters, 30 or 32 as a representation of electrical degrees.

With this background and as an example, assume that, with respect to FIG. 9a, that operation is at time $T_R$ and that load angle regulator, assuming no notching, calculates a next cell pair firing time $T_3$. The control now looks at the current frequency of operation and decides that a notching mode is required. By table lookup for the desired notching mode, all the GTO firing times for the next 60° sequence are known. If a single harmonic is to be eliminated (FIG. 9a) at time $T_R$, $T_3$ is calculated. From the lookup table, $T_{2-3}$ and $T_{1-2}$ are known such that $T_{R-1}$ can be calculated and loaded into the load fire counter. $T_{1-2}$ is then loaded into the fire counter preload. Also the next firing mask is loaded into the firing mask preload. At time $T_1$ in hardware, this firing mask preload shifts into the load firing mask causing a new pair of GTOs to fire and a short interrupt is generated which shifts time $T_{1-2}$ into the fire counter load, preloads $T_{2-3}$ into the fire counter and preloads the next firing mask such that at time $T_2$ the next firing mask is loaded and the fire counter loaded with $T_{2-3}$. At time $T_3$ the next firing mask is loaded in hardware and the next load calculation is called.

In a similar fashion, if two harmonics are to be eliminated (see FIG. 9b) at time $T_R$, $T_5$ is calculated and from table lookup times $T_{1-2}$, $T_{2-3}$ $T_{3-4}$ and $T_{4-5}$ are known from which $T_{R-1}$ can be calculated and loaded into the load fire counter and $T_{1-2}$ loaded into the load fire counter preload. The next firing mask is also loaded into the firing mask preload. When the firing counter times out, the firing mask preload shifts into the firing mask, a short interrupt is generated which loads $T_{1-2}$ into the firing counter time $T_{2-3}$ into the firing counter preload and the next firing mask into the firing mask preload. This process continues until time $T_5$ when a new load angle regulator calculation is made.

This open loop method of inverter notching can be extended to eliminating any number of harmonics in an inverter output by selectively applying notches thereto subject to the limitations that the hardware requires a certain amount of execution time and of inverter switching loss constraints.

Referencing again FIG. 8, it is seen that the microprocessor 100 includes 8 basic interrupt structures of priorities 1 through 8. The system is versatile and practical since all load and source side regulators and cell firing including load side notching control can be implemented using a single INTEL 80286 microcomputer and a rather sophisticated interrupt structure. The eight interrupt levels are briefly as follows:

PROTECTIVE INTERRUPT—This is the highest priority interrupt. It is a very short interrupt which prohibits any further GTO turn on or turn off firing if there is a fault and the DC link current level is greater than GTO turn off capability.

LOAD FIRE SERVICE INTERRUPT—This very short interrupt is used to load the load side fire counter and next firing mask for load side GTO firings between load angle regulator calculations.

SOURCE FIRE SERVICE INTERRUPT—This is a very short interrupt which occurs 30° after master channel source side thyristor firing and samples the DC link current. Later in the lower priority source driver interrupt, this reading is averaged with another current sampling 30° later and this averaged signal is the DC link current feedback used in the current regulator.

SOURCE FLUX WAVE CROSSOVER INTERRUPT—This short interrupt occurs on source side flux wave zero crossings, that is, at a 360 Hz rate. The source side time counter is read and on every three zero crossings a source side phase lock loop regulator calculation is made. A lower priority software generated interrupt is issued from this interrupt program which calls for either a flux, speed, or synchronizing regulator calculation.

LOAD FLUX WAVE CROSSOVER INTERRUPT—This short interrupt occurs six times per load side cycle on flux wave zero crossings. The load side phase lock loop regulator is run in this interrupt program, its repetitive rate is dependent on the inverter frequency.

LOAD DRIVER INTERRUPT—The inverter start up and load angle regulator calculations are run in this program. The program is executed at six times load fundamental frequency. The GTOs selected for firing and the time to fire are software calculated then loaded into hardware such that actual firing has no software delays. The GTO firings between load angle regulator calculations do not use this program but use look up tables in the short high priority LOAD FIRE SERVICE INTERRUPT program.

SOURCE DRIVER INTERRUPT—The DC link current regulator and source converter thyristor firing angle and firing time calculations are made in this program and then loaded into hardware such that actual thyristor firing time has no software delay.

FLUX REGULATOR, SPEED REGULATOR, SYNCHRONIZING REGULATOR INTERRUPT—These are relatively slow regulator loops, the flux regulator crossover is about 5-10 radians per second, the speed regulator crossover is about 1-3 radians per second, the synchronizing regulator, which is used in bumpless transfer of the motor between the inverter and the 60 Hz supply line, has a crossover of about 0.1-0.5 radians per second. The interrupt is software generated from the higher priority source flux wave crossover interrupt program every 60° of a 60 Hz period. However different regulators are executed every 60° for various values of $\theta$. The flux regulator is called every third interrupt. The speed regulator is also called every third interrupt but staggered from the flux regulator calls. The synchronizing regulator is called every sixth interrupt, staggered with the flux and speed regulator calls.

The referenced microfiche appendix relates to the notching feature and three identifiable portions are included. These are identified as jobs 646, 642 and 644. The software designated job 646 includes in the digital implementation, the phase lock loop functions as well as a zero crossing, when taken in conjunction with the clocks 27 and 31 (FIG. 8). This software is primarily a function of interrupt 5, "LOAD FLUX XO IRQ" (FIG. 8).

Job 642 is primarily accomplished in block 2 ("LOAD FIRE SERV IRQ") and block 6 (LOAD DRIVER IRQ) and performs the function of the load angle control driver.

The third job, job 644, is the load angle control ($a_L$) and is primary the function of the sixth interrupt, "LOAD DRIVER IRQ. The functions of the notch control of the present invention are primarily achieved by the software of jobs 644 and 642.

Thus, it is seen that there is provided a system for eliminating (minimizing) harmonics which is versatile and easily implemented, preferably employing the microcontroller.

While the present invention has been described in its preferred embodiments, modifications thereto will readily occur to those skilled in the art. It is not desired, therefore, that the invention be limited to the specific embodiments shown and described but it is intended to include, within the appended claims, all such modifications as fall within the true spirit and scope of the present invention.

What is claimed is:

1. An alternating current motor drive comprising:
   (a) a polyphase induction motor having corresponding phase windings, said motor having a determined leakage inductance;
   (b) a capacitor bank including a plurality of capacitors connected across said motor phase windings, said capacitor bank and said motor windings exhibiting a defined electrical resonance;
   (c) a current source inverter circuit for supplying output electrical current at controlled frequencies to said motor and capacitor bank; and,
   (d) control means for controlling the operation of said inverter circuit including,
       (1) first means operative to effect an output current having a predetermined waveshape at a desired fundamental frequency,
       (2) means to provide a frequency signal representative of said fundamental frequency, and,
       (3) means responsive to said frequency signal to modify the current waveshape by selectively introducing notches thereinto, said notches varying in number and duration in accordance with a predetermined relationship defined as a function of said electrical resonance and which includes providing no notches at frequencies above a predetermined value and for increasing the number of notches as a function of a decreasing fundamental frequency.

2. The invention in accordance with claim 1 wherein said predetermined value is approximately eighty percent of motor rated frequency.

3. The invention in accordance with claim 1 wherein said number of notches and their duration are predetermined to minimize prescribed harmonics of said fundamental frequency.

4. The invention in accordance with claim 3 wherein said prescribed harmonics selectively include the fifth seventh and eleventh and thirteenth harmonics.

5. The invention in accordance with claim 1 wherein one notch during each one-fourth cycle is provided for each harmonic desired to be minimized.

6. The invention in accordance with claim 5 wherein said rated frequency is sixty hertz and whereas the harmonics to be minimized are related to the fundamental frequency in accordance with the following approximate relationships:

| Frequency (Hz) | Harmonics |
|---|---|
| 49–60 | None |
| 39–49 | 5th |
| 29–39 | 5th and 7th |
| 19–29 | 7th and 11th |
| 9–19 | 11th and 13th |

7. The invention in accordance with claim 1 wherein the predetermined waveshape of the output current of said source inverter is essentially a square wave.

8. The invention in accordance with claim 1 wherein said current source inverter utilizes gate turn off thyristors.

9. The invention in accordance with claim 7 wherien the capacitors of said capacitor bank have a capacitance sufficient to transform the substantially square wave current output of said current source inverter into a basically sine wave for application to said motor.

10. In a motor drive of the type having a current source inverter system including an inverter bridge comprised of semiconductor devices selectively rendered conductive and nonconductive in response to applied signals, said bridge supplying electric current to a parallel combination of a capacitor (bridge) bank and an induction motor having a determined leakage inductance whereby said capacitor bank and said motor exhibits a predetermined electrical resonance, a method of minimizing the effects of harmonics in the currents supplied to said motor comprising:
    (a) storing a predetermined gating sequence of semiconductor conductively to thereby furnish currents to said motor, said currents having a basically square waveshape at fundamental frequencies selected in accordance with an input control signal;
    (b) providing an output signal representative of the extant fundamental frequency; and,
    (c) rendering said semiconductors selectively conductive and non-conductive to provide notches within said fundamental frequency waveshape, said notches varying in number and duration in accordance with a predetermined pattern, defined as a function of said electrical resonance, selected to minimize the effects on said motor of harmonics of the varying applied fundamental frequency wherein said predetermined pattern provides for the absence of notches at fundamental frequencies above a predetermined value and for increasing the number of notches as the fundamental frequency decreases.

11. The method in accordance with claim 10 wherein said predetermined value of motor frequency is approximately eighty percent of rated frequency.

12. The method in accordance with claim 10 wherein one notch is included per one-fourth cycle in the fundamental frequency waveshape for each harmonic of the fundamental frequency intended to be minimized.

13. The method in accordance with claim 11 wherein said rated frequency is sixty hertz and whereas the harmonics to be minimized are related to the fundamental frequency in accordance with the following approximate relationships:

| Frequency (Hz) | Harmonics |
|---|---|
| 49–60 | None |
| 39–49 | 5th |
| 29–39 | 5th and 7th |
| 19–29 | 7th and 11th |
| 9–19 | 11th and 13th. |

* * * * *

UNITED STATES PATENT AND TRADEMARK OFFICE
CERTIFICATE OF CORRECTION

PATENT NO. : 4,763,059

DATED : August 9, 1988

INVENTOR(S) : Paul M. Espelage and James M. Nowak

It is certified that error appears in the above-identified patent and that said Letters Patent are hereby corrected as shown below:

Column 4, line 61, delete "$\omega_S$ and $\omega_L$" and substitute "$\alpha_S$ and $\alpha_L$".

Signed and Sealed this

Twenty-fourth Day of January, 1989

*Attest:*

DONALD J. QUIGG

*Attesting Officer*     *Commissioner of Patents and Trademarks*